(12) United States Patent
Love

(10) Patent No.: US 6,352,122 B1
(45) Date of Patent: Mar. 5, 2002

(54) TOOL FOR PLANTING FLOWER BULBS AND ORNAMENTALS

(75) Inventor: Larry W. Love, 5641 Smooketree Dr., Columbus, IN (US) 47201

(73) Assignee: Larry W. Love, Indianapolis, IN (US)

(*) Notice: Subject to any disclaimer, the term of this patent is extended or adjusted under 35 U.S.C. 154(b) by 0 days.

(21) Appl. No.: 09/481,957

(22) Filed: Jan. 12, 2000

(51) Int. Cl.$^7$ ................................................. A01B 1/00
(52) U.S. Cl. ........................ 172/371; 172/22; 172/41; 172/532; 175/385
(58) Field of Search ............................... 172/19, 21, 22, 172/25, 41, 111, 418, 532, 371; 175/385, 394; 111/106

(56) References Cited

U.S. PATENT DOCUMENTS

| | | | | |
|---|---|---|---|---|
| 357,544 A | * | 2/1887 | Albright | 175/385 |
| 2,119,962 A | * | 6/1938 | Raleigh | 172/41 |
| 2,493,261 A | * | 1/1950 | Porter et al. | 172/111 |
| 2,779,259 A | * | 1/1957 | Kelsey | 172/41 |
| 3,773,122 A | * | 11/1973 | Chromy | 175/385 |
| 3,938,249 A | * | 2/1976 | Chacon | 172/25 |
| 4,078,621 A | * | 3/1978 | Dewar et al. | 175/394 |
| D253,470 S | * | 11/1979 | Sheldon | D15/12 |
| D254,134 S | * | 2/1980 | Sheldon | D15/12 |
| 4,682,917 A | * | 7/1987 | Williams, III et al. | 408/212 |
| 4,901,800 A | * | 2/1990 | Wilson | 172/25 |
| 4,950,111 A | * | 8/1990 | Thomas | 408/212 |
| 4,986,368 A | * | 1/1991 | Underwood et al. | 172/25 |
| 5,067,571 A | | 11/1991 | Niewold et al. | |
| 5,133,269 A | | 7/1992 | Charneski | |
| 5,145,018 A | * | 9/1992 | Schimke et al. | 175/385 |
| 5,228,400 A | | 7/1993 | Luke | |
| 5,433,561 A | * | 7/1995 | Schimke | 408/211 |
| 5,564,353 A | * | 10/1996 | Wade et al. | 111/116 |
| 5,924,369 A | | 7/1999 | Hatcher | |
| 6,191,625 B1 | * | 12/2000 | Mati | 172/111 |

FOREIGN PATENT DOCUMENTS

FR      2613578    * 10/1988

* cited by examiner

Primary Examiner—Robert E. Pezzuto
Assistant Examiner—Nathan Mammen
(74) Attorney, Agent, or Firm—Baker & Daniels

(57) ABSTRACT

A garden tool for planting flower bulbs and ornamentals includes an elongated shaft culminating at one end in a boring bit for starting a planting hole. A pair of fins, each radiating at a non-perpendicular angle from each side of the body of the boring bit for widening the hole and breaking up the dislodged soil. The pulverized soil remains in the hole for covering the seed or bulb after planting. The garden tool cultivates to a depth of approximately 6 inches. The tool is driven from the other end of the elongated shaft by a conventional ⅜ inch to ½ inch electric drill. The tool is suitable for use by the landscape professional doing volume planting or the home gardener and can be used in either prepared or unprepared seed beds. The tool presents an easy to use device which greatly reduces the time and labor associated with the planting process.

19 Claims, 2 Drawing Sheets

TOOL FOR PLANTING FLOWER BULBS AND ORNAMENTALS

FIELD OF THE INVENTION

The invention relates to a tool for planting flowers and or bulbs which can be used both by professional landscapers or the home gardener and horticulturist. The tool is designed for ease of use and saving time in boring holes in the ground for planting. The invention is suitable for use in either prepared or unprepared seed beds.

BACKGROUND OF THE INVENTION

Prior planting tools have tended to be manually operated devices requiring the user to apply his body weight to drive the planting implement into the ground. Gardening under such conditions is very labor intensive and time consuming. The gardener could render the actual planting process easier only by taking measure to prepare his planting beds by tilling prior to actual planting. However, these steps also introduce extra time and labor to the process. U.S. Pat. No. 5,228,400 to Luke and U.S. Pat. No. 5,924,369 to Hatcher are typical of manual planting tools. The devices in these patents incorporate features to make the tools lighter or easier to use and/or to preset the penetration depth of the devices. Though versatile, in that they can be used for planting a variety of flower seeds vegetable seeds or bulbs, the inherent problems associated with using these tools for planting the flower garden or landscaping are not resolved.

Auger planters represent a second major category of devices used for planting flowers and bulbs. Augers do alleviate some of the problems faced by the gardener. These devices are typically electrically operated, being adapted to be driven by conventional electric drills, as is the case with the present invention. U.S. Pat. No. 5,133,269 to Charneski and U.S. Pat. No. 5,067,571 to Niewold, et. al. feature two representative auger planter designs. The Niewold auger is well suited for forming small shallow holes for planting seeds and bulbs and could be considered for use by the home gardener. In addition to performing the planting function, the Charneski auger attempts to solve additional problems such as cutting plastic or planting through mulches. These added features of the Charneski device in effect render it less desirable from a simplicity and ease of use standpoint for the home gardener. While auger type gardening tools make earth boring easier, they also introduce another set of problems into the planting process. Unless working in a prepared seed bed, the auger tends to remove a cylinder of soil that must later be recovered, pulverized and replaced in the hole after the bulb or seed is planted.

There remains the need for a planting tool which can be used by the home gardener or the landscape professional doing volume planting in prepared or unprepared seed beds. For ease of use, the tool should be powered by a conventional electrical drill. It is particularly desirable that soil loosened in forming the hole not be dispelled away from the hole so that the seeds or bulbs are easily covered after planting.

The tool must also be safe to use with any sharp edges being maintained away from the user or his garments. Accordingly, a primary object of the present invention is to provide an improved tool for planting flowers and bulbs which is not labor intensive, which is safe and easy to use, and which can be used to plant in prepared or unprepared seed beds by both the professional landscaper or home gardener alike.

BRIEF SUMMARY OF THE INVENTION

The present invention provides a tool for planting flower bulbs and ornamentals which addresses and solves the aforementioned problems of the prior devices. The invention is designed to form planting holes up to about six inches in depth for seeds and bulbs. The tool can be powered by a conventional $3/8$ inch to $1/2$ inch electric drill.

In one embodiment, the tool is formed with an axial shaft which culminates in a boring bit portion. The shaft length is variable for differing planting applications. In one aspect, the boring bit portion incorporates a pilot point for starting the hole. The boring bit portion further includes a pair of laterally disposed blades. During rotation, the blades break up the soil and dislodge small pebbles or debris.

In a further feature of the invention, the tool incorporates a pair of angled fins that further widen the planting hole and pulverize the loosened soil. Most of the pulverized soil is retained in the hole. Upon reaching the desired depth, the tool is withdrawn and the seed or bulb planted and covered with the retained pulverized soil. As expected, best performance is achieved in prepared beds having soft moist soils; however these conditions are not prerequisites. The inventive tool is preferably of welded construction preferably from tempered metal.

The present invention accomplishes one primary objective of providing an improved tool for planting flowers and bulbs which is not labor intensive and which is safe and easy to use. Another object is to provide a gardening tool which can be used to plant in prepared or unprepared seed beds by both the professional landscaper or home gardener or horticulturist. These and other objects, advantages, and benefits are accomplished according to the devices of the following descriptions of the preferred embodiments of the present invention.

DESCRIPTION OF THE PREFERRED EMBODIMENTS

Figure 1:
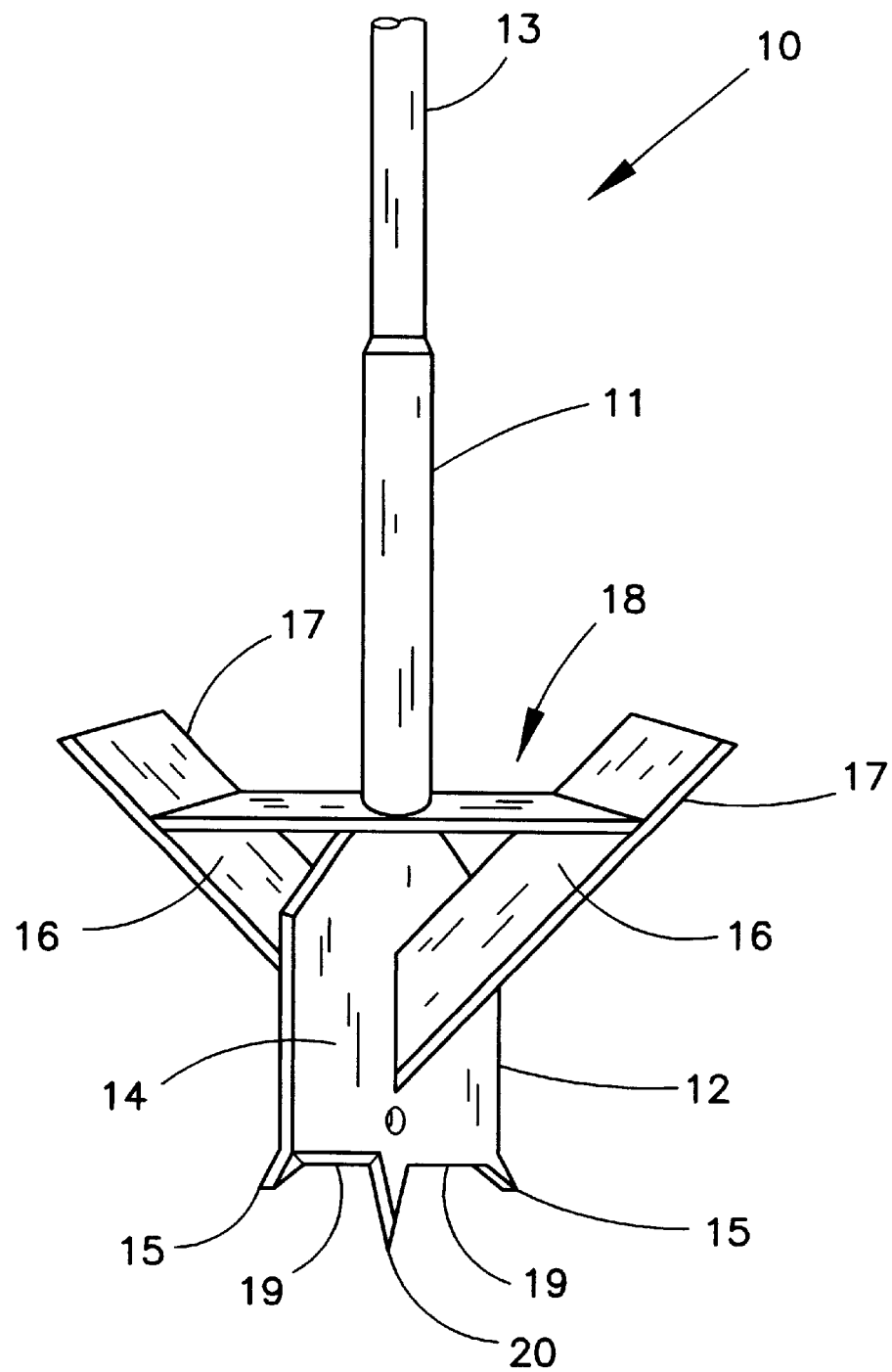
FIG. 1 is a perspective view of the planting tool according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides an improved tool for planting flower bulbs and ornamentals which is safe and easy to use and which greatly reduces the labor intensiveness associated with the planting of flower beds and flower and ornamental landscaping. The tool can be used in both prepared and unprepared flower beds; however, prepared beds will obviously provide better results. The tool is adapted to be driven by a conventional electric drill. Sharp edges are kept to a minimum for safety. The invention is intended for use by both the landscape professional and the home gardener.

Referring to the drawings, a tool for planting flowers and bulbs in accordance with the preferred embodiment of the invention is illustrated in FIG. 1. The tool 10 includes an axial shaft 11 which culminates at one end in a boring bit portion 12 and at an opposite end in an engagement portion 13. The shaft length is variable, having a working length from approximately 6 inches to 16 inches for adapting the tool to the particular planting application. For shaft lengths in this range, the tool can be powered by a conventional ⅜ inch to ½ inch electric drill. The engagement portion 13 is preferably configured for engagement within the chuck of the drill.

The boring bit portion has a pilot point 20 and a pair of blades 15 which locate and start the planting hole. The blades 15 are preferably laterally offset on either side of the pilot point 20. Preferably, the point 20 and blades 15 are sharpened to penetrate even the hardest soil. The pilot point 20 and blades 15 project from a boring bit body 14. Beveled cutting edges 19 connect the pilot point 20 and blades 15. The cutting edges 19 assist in the boring process by scraping and loosening hardened soil. In one specific embodiment, the body 14 is approximately 1 inch in width. The body, under rotation, breaks up the soil and can also dislodge small pebbles or other debris.

In an important feature of the invention, the tool incorporates two fins 16, one projecting from each side of the body 14. The fins are welded to the approximate center of body 14 and extend radially away and upward relative to the shaft 11. A horizontal cross member 18, is welded to and connects the shaft 11 and the fins 16 to reinforce the tool assembly.

Figure 3:
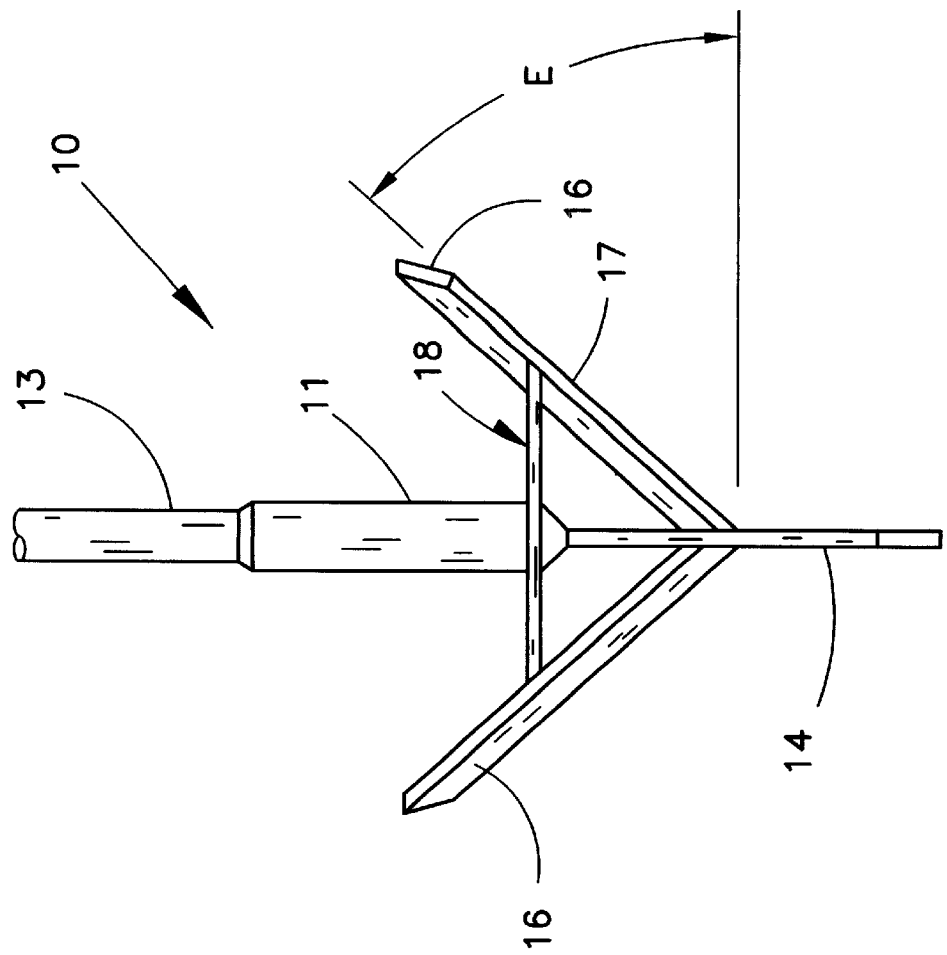
FIG. 3 is a front elevational view of the planting tool of FIG. 1 showing the fin elevation angle.
Figure 2:
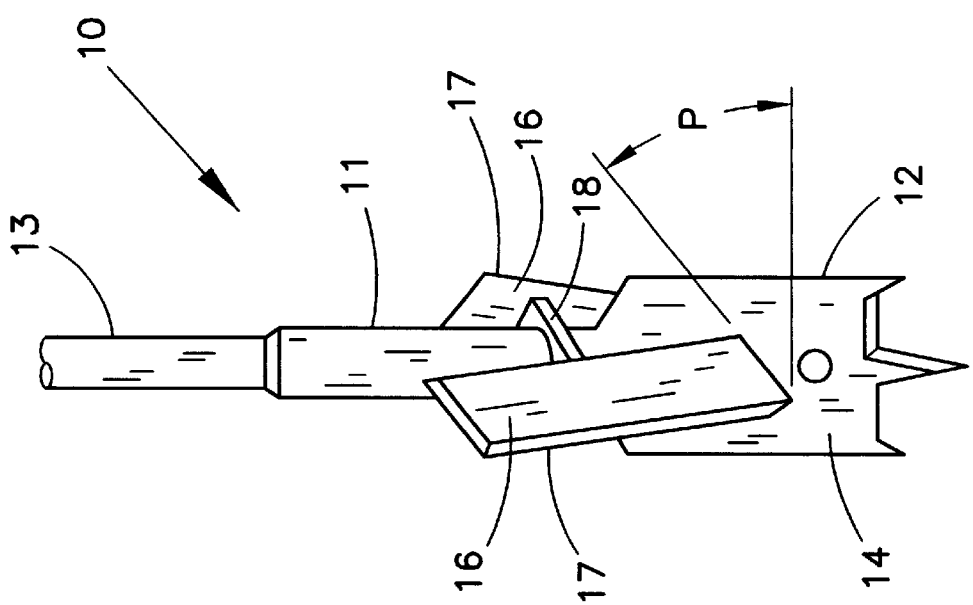
FIG. 2 is a perspective view of the planting tool of FIG. 1 showing the fin pitch angle.

It is contemplated that the invention will be used in drills having conventional right hand operation. Consistent with this direction of rotation, in FIG. 2, the attachment of the fins 16 to the body 14 is shown in further detail. Optimum performance is achieved with the fins 16 preferably installed at a forward pitch angle P of approximately 40 degrees for right hand rotation of the tool. From FIG. 3, the elevational angle E for fins 16 is preferably approximately 45 degrees up from horizontal.

The elevation angle E of fins 16 facilitates the entry of the fins into the pilot bore formed by the point 20 and blades 15. The pitch angle P helps break up the soil and direct the soil upward rather than outward. Thus the fins 16 not only enlarge the planting hole, they also comminute the soil and retain the loose soil within the planting hole.

In the illustrated embodiment, the leading edge 17 of the fins 16 are generally flat. The fins have a thickness of about 0.125 inches so the fins can easily penetrate the earth surrounding the pilot hole formed by the boring bit portion 12. Alternatively, the leading edges 17 can be angled or slightly sharpened to facilitate penetration into hardened soil.

The planting tool 10 described herein is preferably of welded construction. A tempered metal, such as stainless steel, is the most suited construction material for preparing planting beds in hard earth. The tool 10 can be formed from molded plastic for use in loose dirt or potting soil where the resistance to boring is reduced.

While the invention has been described with a certain degree of particularity, it is apparent that variations and modifications can be made with the attainment of all the advantages of the invention without departing from the spirit and scope of the invention disclosed. It is understood that the invention is not limited to the embodiments set fourth herein for purposes of exemplification, but is to be limited only by the scope of the attached claims, including the full range of equivalency to which each element thereof is entitled.

For example, the boring bit portion 12 can have a different configuration from the illustrated embodiment. The portion 12 can be in the form of a small diameter auger. Likewise, the lateral blades 15 can be eliminated in favor of the beveled cutting edges 19 formed at the base of the boring bit body 14. In the preferred embodiment, the fins 16 are affixed to the midpoint of the body 14 so that the lower half of the body 14 helps stabilize the rotating tool as the fins 16 strike the soil. This intersection of the fins to the body can be closer to the pilot point 20 when the tool is used for denser packed soil.

In addition, an extra pair of angled fins can be added to the tool. With this modification, the extra fins can be directly below the fins 16, but of a shorter length. Alternatively, the extra pair of fins can extend from the side edges of the boring bit body 14, offset 90 degrees from the fins 16.

What is claimed is:

1. A garden tool for preparing soil for planting flower bulbs and ornamentals, comprising:
   an elongated shaft culminating in a boring bit at one end thereof, and an engagement portion at an opposite end thereof, said engagement portion configured for engagement by a driving tool and said boring bit configured for creating a hole in the soil; and
   at least one pair of fins, one each projecting from opposite sides of said boring bit, extending radially outward and upward at a non-perpendicular angle relative to said shaft, said fins configured for expanding the hole and tilling dislodged soil as the garden tool is rotated.

2. The garden tool of claim 1 further comprising a support member connecting the upper end of each of said fins to said shaft to reinforce said fins.

3. The garden tool of claim 1, wherein said boring bit includes a pilot point for starting a hole in the soil.

4. The garden tool of claim 3 wherein said boring bit further includes a pair of lateral blades disposed one on each side of said pilot point.

5. The garden tool of claim 3 wherein said boring bit includes a pair of beveled cutting edges disposed one on each side of said pilot point.

6. The garden tool of claim 1 wherein said boring bit includes an elongated body and each of said fins is attached substantially at the center of said boring bit body.

7. The garden tool of claim 1 wherein said fins extend upward at an angle of approximately 45 degrees relative to said elongated shaft.

8. The garden tool of claim 1 wherein said fins have a forward pitch angle of approximately 40 degrees relative to said boring bit.

9. The garden tool of claim 1 wherein said engagement portion of said elongated shaft is adapted to fit into the chuck of an electric drill driving tool.

10. The garden tool of claim 1 wherein the garden tool is of welded metal construction.

11. The garden tool of claim 1 wherein the garden tool is constructed of tempered metal.

12. A garden tool for preparing soil for planting flower bulbs and ornamentals, comprising:

an elongated shaft culminating in a boring bit at one end thereof, and an engagement portion at an opposite end configured for engaging a driving tool, said boring bit having a substantially flat and elongated boring bit body defining a pilot point for starting a hole in the soil; and at least one pair of fins, each attached substantially at the center of said boring bit body and projecting from opposite sides of said boring bit body, each of said fins defining a leading edge extending outward and upward at a non-perpendicular angle relative to said elongated shaft, said fins configured for expanding the hole and tilling dislodged soil as the garden tool is rotated.

13. The garden tool of claim 12 wherein said boring bit body defines a pair of lateral blades, each of said pair of lateral blades defining a pointed end offset on either side of said pilot point for initiating a lateral penetration and for making a substantially circular cut into the soil as the garden tool is rotated.

14. The garden tool of claim 12 wherein each of said fins extends upward at an angle of approximately 45 degrees relative to said elongated shaft.

15. The garden tool of claim 12 wherein each of said fins has a forward pitch angle of approximately 40 degrees relative to said boring bit.

16. The garden tool of claim 12 wherein said engagement portion of said elongated shaft is adapted to fit into the chuck of an electric driving tool.

17. The garden tool of claim 12 wherein said boring bit body includes a pair of beveled cutting edges disposed one on each side of said pilot point.

18. The garden tool of claim 12 wherein said leading edge is beveled.

19. The garden tool of claim 12 further comprises a support member connecting each of said fins to said elongated shaft for reinforcement of the garden tool.

* * * * *